United States Patent
Yamamoto et al.

(10) Patent No.: US 7,831,044 B2
(45) Date of Patent: Nov. 9, 2010

(54) DATA PROCESSING DEVICE

(75) Inventors: Nobuyuki Yamamoto, Osaka (JP);
Daigo Senoo, Osaka (JP)

(73) Assignee: Panasonic Corporation, Osaka (JP)

( * ) Notice: Subject to any disclaimer, the term of this patent is extended or adjusted under 35 U.S.C. 154(b) by 1052 days.

(21) Appl. No.: 10/579,136

(22) PCT Filed: Nov. 10, 2004

(86) PCT No.: PCT/JP2004/016643

§ 371 (c)(1),
(2), (4) Date: May 15, 2006

(87) PCT Pub. No.: WO2005/050909

PCT Pub. Date: Jun. 2, 2005

(65) Prior Publication Data

US 2007/0076873 A1    Apr. 5, 2007

(30) Foreign Application Priority Data

Nov. 14, 2003    (JP) ............................... 2003-385715

(51) Int. Cl.
*H04N 7/169* (2006.01)
(52) U.S. Cl. .................... 380/225; 380/228; 380/240; 380/241; 380/242
(58) Field of Classification Search .................. 380/225
See application file for complete search history.

(56) References Cited

U.S. PATENT DOCUMENTS

| 5,761,302 | A | 6/1998 | Park | |
|---|---|---|---|---|
| 2002/0037080 | A1* | 3/2002 | Katayama et al. | ........... 380/267 |
| 2002/0054681 | A1 | 5/2002 | Kuribayashi | |

(Continued)

FOREIGN PATENT DOCUMENTS

JP    11-242647    9/1999

(Continued)

OTHER PUBLICATIONS

ECMA International Home Page, Standard ECMA-267 3rd Edition—Apr. 2001, [Searched on Oct. 16, 2003], Internet URL <http://www.ecma-internationl.org/publications/standards/Ecma-267.htm>.

*Primary Examiner*—Emmanuel L Moise
*Assistant Examiner*—David J Pearson
(74) *Attorney, Agent, or Firm*—McDermott Will & Emery LLP

(57) ABSTRACT

A data processing device of the invention has an ID creator unit (300) which adds ID information which is set by a CPU and the number of sectors, and outputs a result of the addition as ID information; a scramble SEED value table (103) which produces an initial scramble SEED value, by using the ID information which is outputted from the ID creator unit (300); a normal scramble filter (104) which produces a scramble SEED value (402) for data to be transferred; a frame jumping scramble filter (301) which holds a scramble SEED value of a jumping destination (401) in preparation for jumping; and a selector (105) which selects one of the scramble SEED value (401) and the scramble SEED value (402) and outputs the selected value to the normal scramble filter (104). Accordingly, the data processing device can perform a scrambling process and a de-scrambling process, without depending on the reliability of the data being transferred.

8 Claims, 4 Drawing Sheets

U.S. PATENT DOCUMENTS

| | | | | |
|---|---|---|---|---|
| 2002/0114360 A1* | 8/2002 | Perlman | ............... | 370/536 |
| 2003/0065925 A1 | 4/2003 | Shindo | | |
| 2004/0062398 A1* | 4/2004 | Unger | ............... | 380/277 |
| 2004/0103360 A1* | 5/2004 | Mori et al. | ............... | 714/768 |

FOREIGN PATENT DOCUMENTS

| | | |
|---|---|---|
| JP | 2002-150698 | 5/2002 |
| JP | 2002-170336 | 6/2002 |
| JP | 2003-115830 | 4/2003 |

* cited by examiner

Fig.4  *Prior Art*
| ID | | Initial scramble SEED value |
|---|---|---|
| 0 | 4'b0000 | 15'h0001 |
| 1 | 4'b0001 | 15'h5500 |
| 2 | 4'b0010 | 15'h0002 |
| 3 | 4'b0011 | 15'h2a00 |
| 4 | 4'b0100 | 15'h0004 |
| 5 | 4'b0101 | 15'h5400 |
| 6 | 4'b0110 | 15'h0008 |
| 7 | 4'b0111 | 15'h2800 |
| 8 | 4'b1000 | 15'h0010 |
| 9 | 4'b1001 | 15'h5000 |
| a | 4'b1010 | 15'h0020 |
| b | 4'b1011 | 15'h2001 |
| c | 4'b1100 | 15'h0040 |
| d | 4'b1101 | 15'h4002 |
| e | 4'b1110 | 15'h0080 |
| f | 4'b1111 | 15'h0005 |
Note : x'bxxxx indicates binary number representation,
xh'xxxx indicates hexadecimal number representation.
Fig.5  *Prior Art*
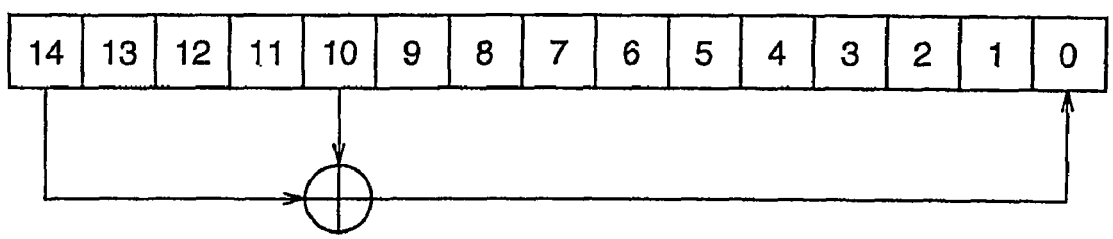

Fig.6  *Prior Art*
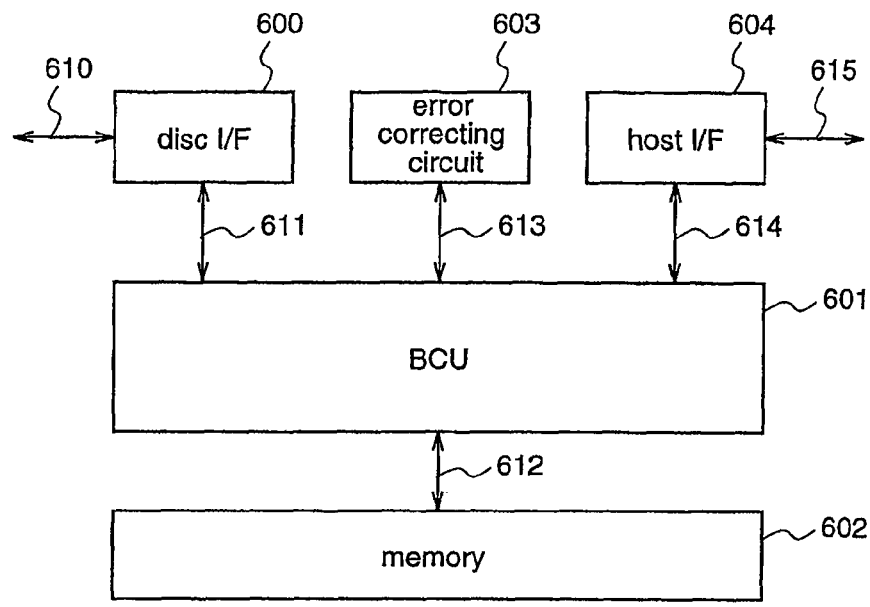
Fig.7  *Prior Art*
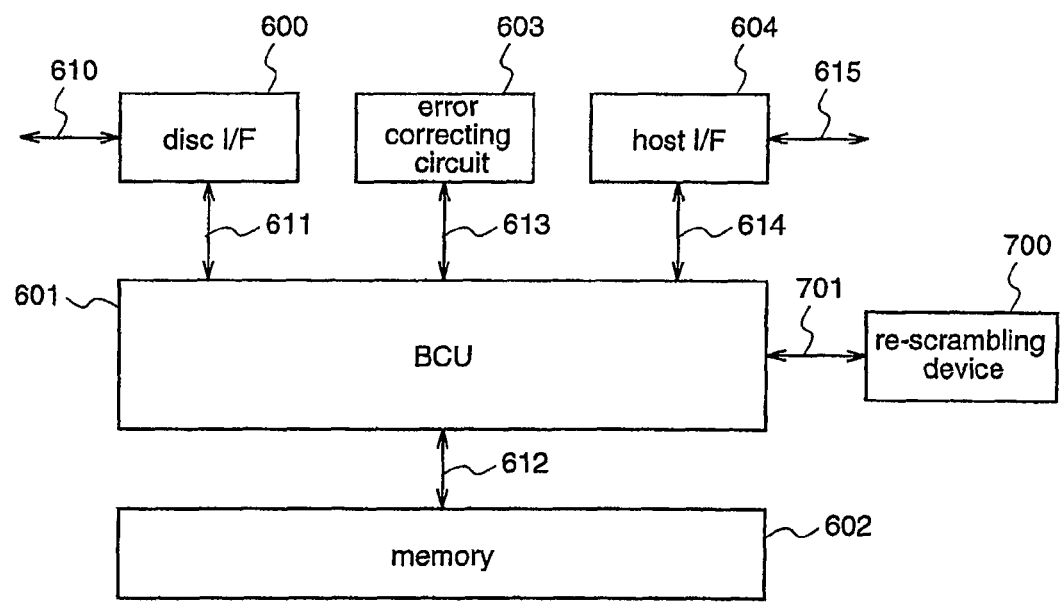

DATA PROCESSING DEVICE

RELATED APPLICATION

This application is a national phase of PCT/JP2004/016643 filed on Nov. 10, 2004, which claims priority from Japanese Application No. 2003-385715 filed on Nov. 14, 2003, the disclosures of which Applications are incorporated by reference herein. The benefit of the filing and priority dates of the International and Japanese Applications is respectfully requested.

TECHNICAL FIELD

The present invention relates to data processing apparatus and, more particularly, to data processing apparatus which carries out a processing of scrambling data which are under being transferred and a processing of de-scrambling the scrambled data which are under being transferred.

BACKGROUND ART

Recently, a variety of DVD players or DVD recorders have been developed for audio applications or recording media applications. In these DVD players or DVD recorders, systems which can realize speeding-up of the operation speed are desired.

A conventional DVD system will be described with reference to FIG. 6. FIG. 6 is a block diagram illustrating a structure example of the conventional DVD system. As shown in FIG. 6, this system includes a disc interface (disc I/F) 600, a bus control circuit (BCU) 601, a memory 602, an error correcting circuit 603, and a host interface (host I/F) 604.

The data reproduction operation in the DVD system constructed as above will be described with reference to FIG. 6. In the DVD system, first of all, the data 610 from a DVD medium is stored into the memory 602 through the disc I/F 600 and the BCU 601. Next, the data is transferred from the memory 602 to the error correction circuit 603 through the BCU 601. The error correction circuit 603 produces a parity for the data to perform error correction, and writes the error-corrected data into the memory 602. Then, the DVD system transmits the error-corrected data from the memory 602 to the host I/F 604 through the BCU 601.

Next, the data recording operation in the DVD system will be described with reference to FIG. 6. The DVD system initially receives recording data 615 which are transmitted from a host (such as a personal computer or an AV decoder), and stores the data in the memory 602 through the host I/F 604 and the BCU 601. Next, the DVD system transfers the recording data from the memory 602 to the error correction circuit 603 through the BCU 601. The error correction circuit 603 produces a parity for the recording data to perform the error correction, and writes the error-corrected recording data into the memory 602. Then, the DVD system transmits the error-corrected recording data from the memory 602 to a DVD medium through the BCU 601 and the disc I/F 600.

Conventionally, the DVD system implements reproduction of data from a DVD medium and recording of data into a DVD medium in the above-mentioned manners (refer to Patent Document 1), and the data which are recorded in the DVD medium are to be scrambled. Therefore, the data recorded in the DVD medium are the data which have been subjected to a scrambling processing (scrambled data). Therefore, a processing for restoring the scrambled data which are transmitted from the disc I/F 600 into normal data (de-scrambling processing) is required at the reproduction. In contrast, at the recording there is a need to make the data before transmitting the same the disc I/F 600 to the DVD medium subjected to a scrambling processing.

Hereinafter, a scrambling processing according to the DVD scrambling specifications will be described. First of all, ID information which is included in an ID area at the top of the data is converted into an initial scramble seed value (initial scramble SEED value) on the basis of a conversion table shown in FIG. 4. In FIG. 4, the ID information is expressed in a binary number and the initial scramble SEED value is expressed in a hexadecimal number. Further, since a scramble block unit is a sector comprising plural frames under the DVD scrambling specifications, the ID information is included at the top of a sector. The ID information includes information such as a sector number, a layer or a region which the sector belongs to, and the like.

Next, a scramble SEED value is produced from the initial scramble SEED value, as shown in FIG. 5. FIG. 5 is a diagram showing feedback shift registers each storing a scramble SEED value. In the DVD scramble specifications, as shown in FIG. 5, for every 1 bit of main data, an exclusive-OR operation of the 14th-bit and the 10th-bit both of the scramble SEED value is taken and the obtained result is stored in the 0th-bit, and then, the information from the 13th-bit to the 0th-bit are shifted to left, and an exclusive-OR operation and a shift operation are carried out to the amount of the main data, to produce scramble SEED values. Then, scrambling is carried out by taking exclusive-OR operations of the data to be transferred (except for parity) and the scramble SEED values which are produced as described above (refer to Non-patent Document 1). Further, in carrying out de-scrambling, exclusive-OR operations are taken of the scrambled data and the scramble SEED values, thereby de-scrambling the scrambled data.

From the above-described specifications, there are two requirements for the DVD system to carry out scrambling and de-scrambling successfully.

(1) ID Information Includes No Error.

If the ID information includes errors, the initial value of the scramble SEED value (initial scramble SEED value) includes errors and thereby all data will be destroyed by a scramble filter which performs the scrambling process and the de-scrambling process.

(2) Data Address and Address of the Scramble Seed Value Coincide with Each Other.

Since the scramble seed value is different dependent on the position of the scramble SEED value, it is required that the data address and the address of the scramble filter always coincide with each other. If a deviation occurs, the data will be will be destroyed from that address by the scramble filter.

Since there are the above-described two problems, it is general that a scramble filter is inserted in the host interface shown in FIG. 6 in a conventional DVD system. It is because the ID information after the error correction is conducted has a high reliability, continuity of the data is also secured because there are data of all addresses after the error correction, thereby enabling the de-scrambling.

Patent Document 1: Japanese Unexamined Patent Publication No. 11-242647 (FIG. 1)

Non-patent Document 1: ecma international Home Page "DVD format" [searched on Oct. 16, 2003], Ecma-267.pdf

DISCLOSURE OF THE INVENTION

However, when the data to be recorded in a DVD media is subjected to scrambling by providing a scrambling filter in a host interface as in a prior art DVD system, there is a problem that a high speed operation can not be carried out. This problem will be described.

At carrying out a recording operation, the DVD system which has provided a scramble filter in the host interface makes the data to be recorded subjected to scrambling employing an ID information which is previously determined for the data through the host interface, and stores the scrambled data in a memory. Then, the scrambled data is subjected to an error correction by adding parities by an error correction circuit, and finally, the data after the error correction is carried out is transmitted to a DVD medium through a disk interface.

However, in the standards of such as DVD-RAM, there is a case where the address of data which is recorded in a DVD disc is deviated from the address which is previously determined. When the address of the data on the DVD medium is different from the address which was previously determined, the ID information is also different, and therefore, it is required to once de-scramble the scrambled data and de-scramble and to again make the data subjected to scrambling.

Therefore, in the DVD system, a re-scrambling device is required as shown in FIG. 7. Hereinafter, a description is given of an operation of the DVD system shown in FIG. 7.

At carrying out a recording operation, the data to be recorded is subjected to scrambling using an ID information which is previously determined, through the host interface, and the scrambled data is stored in the memory 602. Here, when the ID information of the data is different from the ID information which was previously determined, the scrambled data is subjected to de-scrambling and the de-scrambled data is subjected to scrambling using a SEED value which is obtained from a correct ID information in the re-scrambling device 700, and the data is stored in the memory 602. Then, the data is subjected to an error correction by adding a parity in the error correction circuit 603, and finally the error corrected data is transmitted to the DVD medium through the disc interface 600. In the DVD system as described above, a process of carrying out re-scrambling is added, thereby resulting in an obstruction to the increase in the operation speed.

Now, a case is considered where a scrambling filter is included not in a host interface 604, but in a disc interface 600.

In this case, at carrying out a recording operation, the data from the host interface 604 is stored in a memory 602, without being subjected to scrambling. Thereby, it is possible to make the data subjected to scrambling in the disc interface 600 by adding a parity to the data using the error correction circuit 603 to employ a high reliability ID information and to transmit the scrambled data to a DVD medium, even when the address is changed.

In this VDV system, however, there arise problems when scrambled data is reproduced from the DVD medium. That is, there are two problems in carrying out de-scrambling processing through the path of disc interface 600 in the reproduction operation.

(1) When the scrambled data which is transferred from the DVD medium is to be de-scrambled, since the scramble data is one which is before being subjected to the error correction processing by the error correction circuit, a correct ID information may not be obtained.

Here, the ID information is included in top 12 bytes of each sector, and is information which is essential for carrying out a de-scrambling processing. The initial scramble SEED value is determined from this ID information. The scrambling data before carrying out the error correction processing may be erroneous data and lack in reliability. The scramble filter may continue erroneous de-scrambling processing if it cannot obtain a correct ID information. As a result, data which includes erroneous data of one sector which is a unit for executing scrambling processing data carry would be stored in a memory, thereby the error correction circuit cannot carry out error correction for one sector.

(2) When a jumping processing which is an abnormal system processing is produced by such as data failure, a correct scramble SEED value from the jumping destination becomes unclear.

The sector as a unit of scrambling blocks is constituted by a plurality of frames. In the DVD specification, there are data of 2392 bytes for one sector, comprising main data and the parity data (including dummy data) which is necessary at performing data correction. In the DVD format, one sector comprises 13 lines and one line comprises 184 bytes including dummy data. Up to lines 12 are constituted by parity data called as C1, and the line 13 is constituted by those called as C2 and C1C2. Those which are obtained by dividing one sector into 26 is called as one frame. Accordingly, one line is constituted by two frames and the boundary between frames comprises 91 bytes (since the final two bytes in the 184 bytes are dummy data). Noticing on the scramble SEED value, if the data is continuous data, the scramble SEED values are also operated continuously. However, when a frame jumping is produced in at some frame, the data to be transferred would jump to the top of the next frame. When the frame jumping is produced, it results in that there is no main data from a point where the frame jumping is produced to the next frame top. Therefore, no operation for obtaining the scramble SEED value is conducted, and an operation would start from the next frame. This means that the scramble SEED value is erroneous and if the de-scrambling processing is carried out, erroneous data is produced. In other words, when a frame jumping processing is produced at some frame, correct scramble SEED values from the point having jumped to the next frame becomes unclear.

In order to solve the problems described above, it is an object of the present invention to provide a data processing apparatus which carries out scrambling processing and de-scrambling processing without depending on the reliability of the data under being transferred.

MEASURES TO SOLVE THE PROBLEMS

According to the present invention, there is provided a data processing apparatus for scrambling data which are under being transferred or de-scrambling data which are under being transferred or de-scrambling scrambled data which are being transferred, which comprises: an ID storing section which stores an ID information relating to a sector which is a scrambling block unit of data under being transferred, which ID information is set by a central processing unit; a sector counter section which counts the number of the sectors in the data under being transferred; an operation section which adds the ID information from the ID storing section and the sector number information from the sector counter section, a scramble seed value table conversion section which converts the addition result which is inputted from the operation section into a scrambling seed value; a scramble filter of at least one byte which, making a period during which data of a predetermined length is transferred one cycle, produces a next cycle scramble seed value from the present cycle scramble seed value; a selector which selects a scramble seed value which is outputted from the scramble seed table conversion section when the data to be transferred is data at a top of a sector, and selects the scramble seed value which is outputted from the scramble filter section otherwise, to output the selected result to the scramble filter; and the data under being transferred being scrambled or the scrambled data under being transferred being de-scrambled using the scramble seed value which is outputted from the selector.

According to the present invention, there is provided a data processing apparatus, which comprises: the scramble filter section which includes at least two scrambling filters, selects a scrambling filter in accordance with the data length of the data to be transferred to produce a next cycle scrambling seed value from the present cycle scrambling seed value.

According to the present invention, there is provided a data processing apparatus for scrambling data which are under being transferred or de-scrambling scrambled data which are being transferred, which comprises: an ID storing section which stores an ID information relating to a sector which is a scrambling block unit of data under being transferred, which ID information is set by a central processing unit; a sector counter section which counts the number of the sectors in the data under being transferred; an operation section which adds the ID information from the ID storing section and the sector number information from the sector counter section, a scramble seed value table conversion section which converts the addition result which is inputted from the operation section into a scrambling seed value; a scramble filter of at least one byte which, making a period during which data of a predetermined length is transferred one cycle, produces a next cycle scramble seed value from the present cycle scramble seed value; a selector which selects a scramble seed value which is outputted from the scramble seed table conversion section when the data to be transferred is data at a top of a sector, and selects the scramble seed value which is outputted from the scramble filter section otherwise, to output the selected result to the scramble filter; and the data under being transferred being scrambled or the scrambled data under being transferred being de-scrambled using the scramble seed value which is outputted from the selector.

According to the present invention, there is provided a data processing apparatus for de-scrambling scrambled data which are under being transferred, which comprises: an ID storing section which stores an ID information relating to a sector which is a scrambling block unit of data under being transferred, which ID information is set by a central processing unit; a sector counter section which counts the number of the sectors in the data under being transferred; an operation section which adds the ID information from the ID storing section and the sector number information from the sector counter section; a scramble seed value table conversion section which converts the addition result which is inputted from the operation section into a scrambling seed value; a scramble filter which, making a period during which data of a predetermined length is transferred one cycle, produces a next cycle scramble seed value from the present cycle scramble seed value; a jumping processing scramble filter which receives the addition result of the operation section and the address information of the data under being transferred, produces a scramble seed value at the destination using the addition result, providing with a case where a jumping in which a part of the data under being transferred is failed, to hold the same value, and outputs a scramble seed value corresponding to the data address at the destination when the jumping processing has occurred; a first selector which selects the scrambling seed value which is outputted from the jumping processing scrambling filter when the jumping processing has occurred, and selects the scramble seed value which is outputted from the scrambling filter otherwise, to output the selected result; a second selector which selects the scrambling seed value which is outputted from the scramble seed value table conversion section when the data under being transferred is a top of a sector, and selects the scramble seed value which is outputted from the first selector otherwise, to output the selected result to the scramble filter; and the scrambled data under being transferred being de-scrambled using the scramble seed value which is outputted from the second selector.

According to the present invention, there is provided a data processing apparatus, which comprises: the scramble filter section which includes at least two scrambling filters, selects a scrambling filter in accordance with the data length of the data to be transferred, to produce a next cycle scrambling seed value from the present cycle scrambling seed value.

According to the present invention, there is provided a data processing apparatus, which comprises: the scramble filter section which includes at least two scrambling filters, selects a scrambling filter in accordance with the jumping destination of the data to be transferred, to produce the scrambling seed value.

EFFECTS OF THE INVENTION

According to the present invention, since a data processing apparatus for scrambling data which are under being transferred or de-scrambling scrambled data which are being transferred, comprises an ID storing section which stores an ID information relating to a sector which is a scrambling block unit of data under being transferred, which ID information is set by a central processing unit, a sector counter section which counts the number of the sectors in the data under being transferred, an operation section which adds the ID information from the ID storing section and the sector number information from the sector counter section, a scramble seed value table conversion section which converts the addition result which is inputted from the operation section into a scrambling seed value, a scramble filter of at least one byte which, making a period during which data of a predetermined length is transferred one cycle, produces a next cycle scramble seed value from the present cycle scramble seed value, a selector which selects a scramble seed value which is outputted from the scramble seed table conversion section when the data to be transferred is data at a top of a sector, and selects the scramble seed value which is outputted from the scramble filter section otherwise, to output the selected result to the scramble filter, and the data under being transferred is scrambled or the scrambled data under being transferred is de-scrambled using the scramble seed value which is outputted from the selector, a scrambling processing having a high reliability or a de-scrambling processing in a disc interface section in a DVD system can be carried out, using a correct scramble seed value which is produced by using, not the ID information included in the data under being transferred, but a secured information which is set by a central processing unit. Further, it is possible to perform data transfer of two bytes or more during one cycle, thereby enabling the descrambling process in which data to be operated change continuously, at high speeds.

According to the present invention, since in the data processing apparatus, the scramble filter section which includes at least two scrambling filters, selects a scrambling filter in accordance with the data length of the data to be transferred to produce a next cycle scrambling seed value from the present cycle scrambling seed value, a scramble seed value which correspond to at least two data lengths can be produced.

According to the present invention, since a data processing apparatus for scrambling data which are under being transferred, comprises an ID storing section which stores an ID information relating to a sector which is a scrambling block unit of data under being transferred, which ID information is set by a central processing unit, a sector counter section which counts the number of the sectors in the data under being transferred, an operation section which adds the ID information from the ID storing section and the sector number information from the sector counter section, a scramble seed value table conversion section which converts the addition result which is inputted from the operation section into a scrambling seed value; a scramble filter which, making a period during which data of a predetermined length is transferred one cycle, produces a next cycle scramble seed value from the present cycle scramble seed value, a jumping processing scramble filter which receives the addition result of the operation section and the address information of the data under being transferred, produces a scramble seed value at the destination using the addition result, providing with a case where a jumping in which a part of the data under being transferred is failed, to hold the same value, and outputs a scramble seed value corresponding to the data address at the destination when the jumping processing has occurred; a first selector which selects the scrambling seed value which is outputted from the jumping processing scrambling filter when the jumping processing has occurred, and selects the scramble seed value which is outputted from the scrambling filter otherwise, to output the selected result; a second selector which selects the scrambling seed value which is outputted from the scramble seed value table conversion section when the data under being transferred is a top of a sector and selects the scramble seed value which is outputted from the first selector otherwise, to output the selected result to the scramble filter; and the data under being transferred being scrambled using the scramble seed value which is outputted from the second selector, even when data failure (data jumping) has occurred during the data being transferred, a scrambling processing having a high reliability in a disc interface section in a DVD system can be carried out continuously.

According to the present invention, since a data processing apparatus for de-scrambling scrambled data which are under being transferred, which comprises: an ID storing section which stores an ID information relating to a sector which is a scrambling block unit of data under being transferred, which ID information is set by a central processing unit; a sector counter section which counts the number of the sectors in the data under being transferred; an operation section which adds the ID information from the ID storing section and the sector number information from the sector counter section; a scramble seed value table conversion section which converts the addition result which is inputted from the operation section into a scrambling seed value; a scramble filter which, making a period during which data of a predetermined length is transferred one cycle, produces a next cycle scramble seed value from the present cycle scramble seed value; a jumping processing scramble filter which receives the addition result of the operation section and the address information of the data under being transferred, produces a scramble seed value at the destination using the addition result, providing with a case where a jumping in which a part of the data under being transferred is failed, to hold the same value, and outputs a scramble seed value corresponding to the data address at the destination when the jumping processing has occurred; a first selector which selects the scrambling seed value which is outputted from the jumping processing scrambling filter when the jumping processing has occurred, and selects the scramble seed value which is outputted from the scrambling filter otherwise, to output the selected result; a second selector which selects the scrambling seed value which is outputted from the scramble seed value table conversion section when the data under being transferred is a top of a sector, and selects the scramble seed value which is outputted from the first selector otherwise, to output the selected result to the scramble filter; and the scrambled data under being transferred being de-scrambled using the scramble seed value which is outputted from the second selector, even when data failure (data jumping) has occurred during the data being transferred, a de-scrambling processing having a high reliability in a disc interface section in a DVD system can be carried out continuously.

According to the present invention, since in the data processing apparatus, the scramble filter section which includes at least two scrambling filters, selects a scrambling filter in accordance with the data length of the data to be transferred, to produce a next cycle scrambling seed value from the present cycle scrambling seed value, it is possible to produce a scramble seed value which corresponds to at least two kinds of data lengths.

According to the present invention, since in the data processing apparatus, the scramble filter section which includes at least two scrambling filters, selects a scrambling filter in accordance with the jumping destination of the data to be transferred, to produce the scrambling seed value, even when frame jumping processing has occurred at an odd frame or an even frame in the data under being transferred, a correct scrambling seed value can be produced from the top of the frame at the jumping destination.

BRIEF DESCRIPTION OF THE DRAWINGS

FIG. 4 is a diagram showing an ID/scramble SEED value conversion table in the DVD specifications.

FIG. 5 is a diagram for explaining a scrambling process by the scramble filter.

FIG. 6 is a diagram illustrating a structure of a conventional DVD system.

FIG. 7 is a diagram for explaining a recording operation in the conventional DVD system.

DESCRIPTION OF THE NUMERALS

Figure 1:
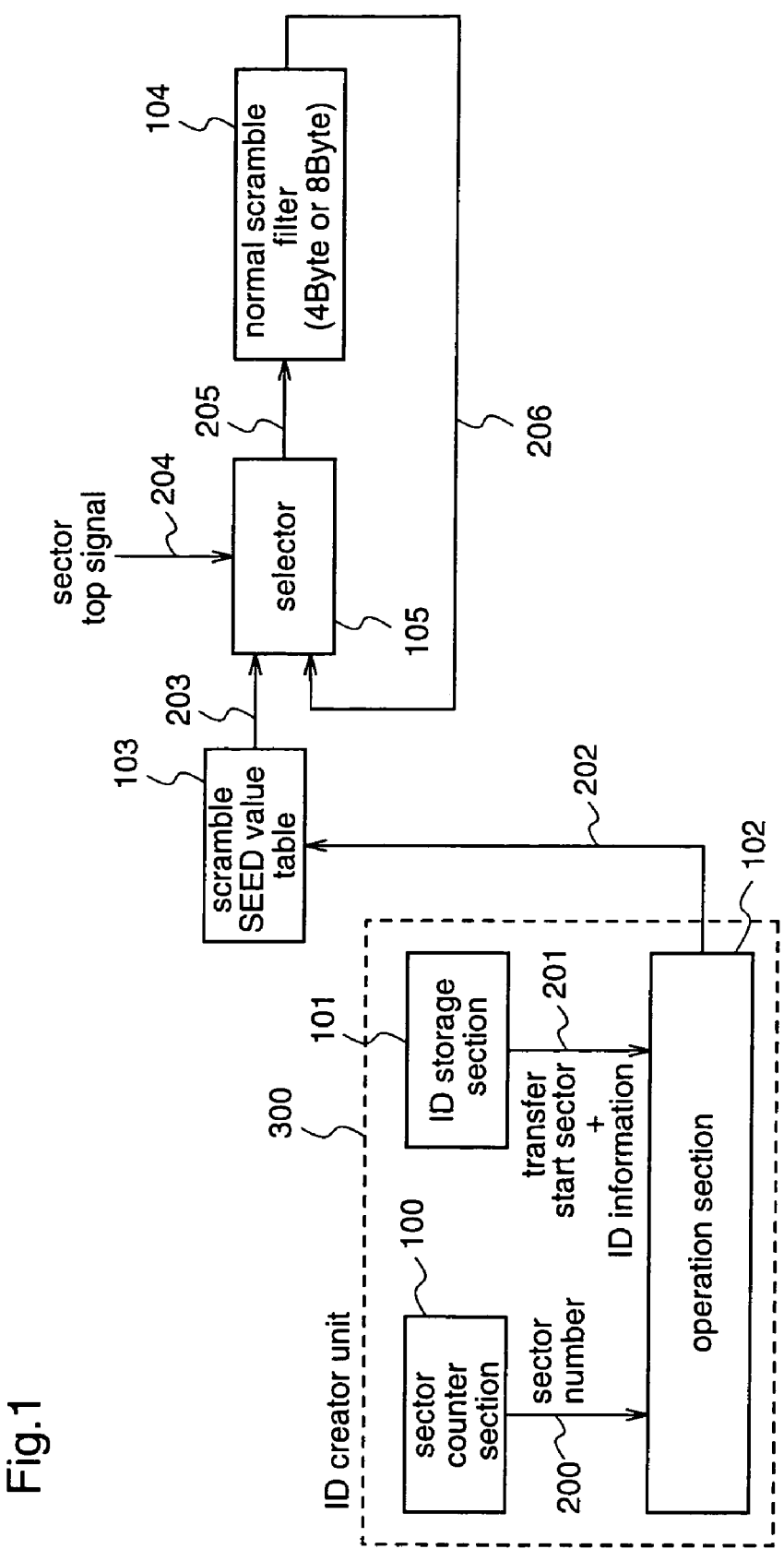
FIG. 1 is a block diagram illustrating an exemplary structure of a data processing device according to a first embodiment of the present invention.

100 . . . sector counter section
101 . . . ID storage section
102 . . . operation section
103 . . . scramble SEED value table
104 . . . normal scramble filter
105, 303, 503 . . . selector
300 . . . ID creator unit
301 . . . frame jumping scramble filter
500 . . . initial value generating table
501 . . . odd number frame jumping filter
502 . . . even number frame jumping filter
504 . . . register
600 . . . disc I/F
601 . . . BCU
602 . . . memory 603 ... error correcting circuit
604 ... host I/F
700 ... re-scrambling device

BEST MODE CARRYING OUT THE INVENTION

Embodiment 1

Hereinafter, a data processing device according to a first embodiment of the present invention will be described with reference to FIG. 1. The data processing device according to the first embodiment is provided in the disc interface shown in FIG. 6, and it carries out a processing of scrambling the data under being transferred and a processing for de-scrambling the scrambled data under being transferred.

In FIG. 1, the data processing device includes an ID creator unit 300, a scramble SEED value table 103, a selector 105, and a normal scramble filter 104. The ID creator unit 300 includes a sector counter unit 100, an ID storing section 101, and an operation section 102.

The ID storing section 101 stores sector information of 8 bit (bit wide [7:0]), which is set by a central processing unit (CPU) such as a microcomputer. The sector information comprises upper four bits ([7:4]) presenting ID information and the lower four bits ([3:0]) presenting from which sector among the blocks transfer of data is started. The ID information includes information indicating the sector number, and the layer or region which the sector belongs to.

The sector counter section 100 is an apparatus which counts up each time transfer of data is completed by one sector from the initial value of 4'h0, and outputs the number of the sectors which are under being transferred after the start of the transfer, as sector number information 200.

The operation section 102 adds the sector information 201 which is outputted from the ID storing section 101 and the sector number information 200 which is outputted from the sector counter unit 100 to outputs its upper 4-bit as ID information 202.

The scramble SEED value table 103 receives the ID information 202, and converts the ID information 202 into an initial scramble SEED value 203 using the table as shown in FIG. 4 to outputs the initial scramble SEED value 203.

The selector 105 selects the scramble SEED value 203 to output the value 203 as a scramble SEED value 205 when it receives a sector top signal 204 indicating the top of the sector, i.e., when transferred data is the top of the sector, while it selects a scramble SEED value 206 which is outputted from the normal scramble filter 104 which will be described later to output the value 206 as the scramble SEED value 205 when the transferred data is not the top of the sector. The selector 105 receives the sector top signal 204 from a CPU such as a microcomputer.

The normal scramble filter 104 includes at least two scramble filters. In this first embodiment, descriptions will be given of a case where the filter 104 includes a 4-byte scramble filter and an 8-byte scramble filter. The normal scramble filter 104 receives the scramble SEED value 205 in one cycle during which data of a predetermined length (4 byte or 8 byte) are transferred, and makes the value pass through the scramble filter to produce and output a next cycle scramble SEED value 206. That is, it produces the scramble SEED value for the next cycle in accordance with the scrambled data length, i.e., at after 4 byte when the data is 4 byte, and at after 8 byte when the data is 8 byte.

The data processing device further includes an extension filter (not shown) for extending the scramble SEED value which is produced as described by the amount of data to be transferred and a circuit (not shown) for taking an exclusive-OR operation of the extended scramble SEED value and the data for each bit, and carries out a processing of scrambling data and a processing of de-scrambling scrambled data using these circuits. Since the extension filter and the exclusive-OR circuit do not constitute essential parts of the present invention, their descriptions are omitted.

The operation of the data processing device constructed as above will be described.

The value of the ID information which is set in the ID storing section 101 is expressed as 0x01 in hexadecimal number. The initial value of the sector counter unit 100 is expressed as 0x0 in hexadecimal number. The operation section 102 adds the sector information 201 (0x01) from the ID storing section 101 and the sector number information 200 (0x0) from the sector counter unit 100, thereby obtaining 0x01. The operation section 102 outputs upper 4-bit information, i.e., 0x0 as ID information 202 to the scramble SEED value table 103.

The scramble SEED value table 103 determines an initial scramble SEED value from the ID information 202 using the conversion table shown in FIG. 4. In the first embodiment, since the ID information 202 is 0x0, the initial scramble SEED value 203 determined by the scramble SEED value table 103 is 15'h0001.

The scramble SEED value 203 is a scramble SEED value which is used only at the top of the sector. The scramble SEED value 203 is used only when it is notified that it is at the sector top by the sector top signal 204, and then, the selector 105 selects the scramble SEED value 203 to output the same as the scramble SEED value 205. That is, 15'0001 is selected at this timing.

Subsequent scramble SEED values are produced by the normal scramble filter 104. More specifically, as shown in FIG. 5, for every 1 bit of main data, an exclusive-OR operation of the 14th-bit and the 10th-bit both of the scramble SEED value is taken and the obtained result is stored in the 0th-bit, and then, the information from the 13th-bit to the 0th-bit are shifted to left. The above-mentioned exclusive-OR operation and shift operation are carried out to the amount of the main data, thereby generating the scramble SEED value.

For example, when the scramble SEED value is produced for 8-byte of the main data, the exclusive-OR operation and the shift operation are carried out by 8×8 bit, thereby generating the scramble SEED value for the 8-byte main data.

At carrying out the demodulating transfer, i.e., when data from a DVD medium are transferred to the BCU 601 via the disc interface 600 in the DVD system shown in FIG. 6, since there are a case where the data are 4 byte and a case where the data are 8 byte, the normal scramble filter 104 prepares a scramble filter for 4 byte and a scramble filter for 8 byte. The 4 byte scramble filter repeatedly carries out the exclusive-OR operation and the shift operation 32 times, thereby generating a start scramble SEED value for the next main data. The 8 byte scramble filter repeatedly carries out similar processing as the 4 byte scramble filter 64 times, thereby generating a scramble SEED value for the next main data which is after 8 byte.

For example, when the scramble SEED value 203 (0x0001) is made pass through the 8 byte scramble filter, the scramble SEED value 206 for the next cycle main data is 0x0100. Then, this scramble SEED value 206 is again transmitted to the selector 105. Then, since the current main data is at 8 byte after the top of the sector and is not the main data at the top of the sector, the selector 105 selects the scramble SEED value 206. When the amount of main data transferred in the next cycle is also 8 byte, the subsequent scramble SEED value 206 is 0x0022.

When the transfer of data by one sector is completed, in order to perform processing from the top of the second sector, the sector counter unit 100 counts up the initial value to output the count result as the sector number information 200, before the top data of the second sector is transferred. Thereby, the upper 4-bit of the ID information 202 which is outputted from the operation section 102 is incremented by one, and thus the ID information 202 indicates an ID information of a sector which is a scramble block unit in the next cycle. With this ID information 202, the scramble SEED value 203 which is used only at the top of the sector is produced again by the scramble SEED value table 103.

As described above, the data processing device according to the first embodiment includes the ID creator unit 300 comprising the sector counter unit 100, the ID storing section 101, and the operation section 102, and produces the scramble SEED value using not the ID information included in the data under being transferred but the ID information which is set in the ID creator unit 300 by an external CPU or the like. Therefore, it is possible to de-scramble scrambled data from a DVD medium by using correct ID information in the disc interface of the DVD system as well as it is possible to scramble data from the host (such as a personal computer or an AV decoder) using correct ID information.

Embodiment 2

Figure 2:
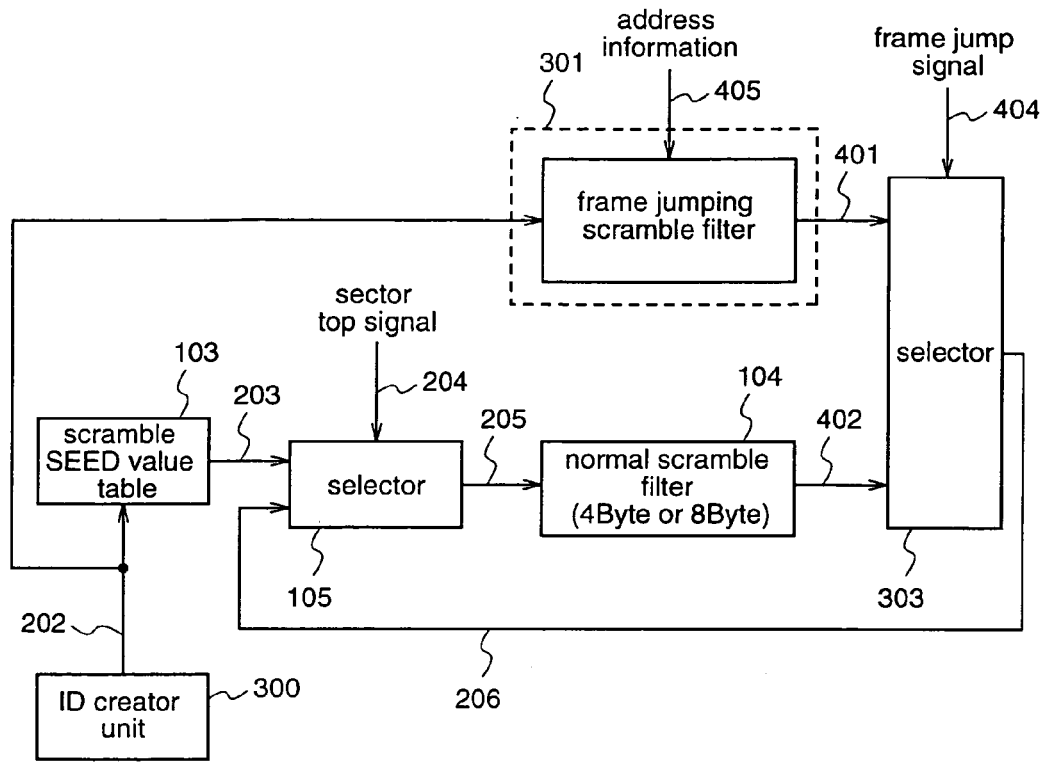
FIG. 2 is a block diagram illustrating an exemplary structure of a data processing device according to a second embodiment of the present invention.

Hereinafter, a data processing device according to a second embodiment of the present invention will be described with reference to FIG. 2. The same components as in the data processing device shown in FIG. 1 are denoted by the same references, and their descriptions are omitted.

The data processing device according to the second embodiment further includes a frame jumping scramble filter 301 and a selector 303, in addition to the components in the data processing device shown in FIG. 1, and is characterized in that when an abnormal processing (jumping processing) such as data omission occurs, it corrects generation of the scramble SEED value in frame units.

The ID creator unit 300 outputs the ID information 202 corresponding to a sector, as described in the first embodiment.

The scramble SEED value table 103 receives the ID information 202, converts the information 202 into the initial scramble SEED value 203 to output the same.

The selector 105 selects the scramble SEED value 203 to output the same as the scramble SEED value 205 when it receives the sector top signal 204, i.e., when transferred data are the top of the sector, and selects the scramble SEED value 206 which is outputted from the selector 303, which is described later, to output the same as the scramble SEED value 205 when the data are not the sector top.

The normal scramble filter 104 includes at least two scramble filters. In this second embodiment, descriptions will be given of a case where the filter 104 includes a 4 byte scramble filter and an 8 byte scramble filter. The normal scramble filter 104 receives the scramble SEED value 205 in one cycle during which data of a predetermined length (in this case, 4 byte or 8 byte) are transferred, and make the value pass through the scramble filter to produce and output a next cycle scramble SEED value 402. That is, it produces the scramble SEED value for the next cycle in accordance with the data length of scrambled data, i.e., at after 4 byte when the data is 4 byte, and at after 8 byte when the data is 8 byte.

The frame jumping scramble filter 301 receives address information 405 of the data which is under being transferred, and produces a scramble SEED value after frame-jumping before the frame jumping processing occurs to output the same as the scramble SEED value 401. Here, the frame jumping scramble filter 301 receives the address information 405 from the CPU such as a microcomputer.

The selector 303 receives the scramble SEED value 401 and the scramble SEED value 402, and it selects the scramble SEED value 401 after frame-jumping when a frame jump signal 404 is inputted, i.e., when the frame jumping occurs, while it selects the scramble seed value 402 otherwise to output the selected value as the scramble SEED value 206. Here, the selector 303 receives the frame jump signal 404 from the CPU such as a microcomputer.

The operation of the data processing device constructed as above will be described.

In the following explanations, it is assumed that the initial ID is 0x0 and the start sector number is 0x00. Further, the descriptions will be given of a case where the frame jumping occurs after 8-byte main data are transferred.

The scramble SEED value table 103 produces the initial scramble SEED value 203 (0x0001) on the basis of the ID information 202 (0x0) which is obtained from the ID creator unit 300 to output the same.

The selector 105 selects the initial scramble SEED value (0x0001) 203 when it receives the sector top signal 204 to output the same as the scramble SEED value 205.

Since no frame jumping occurs here, the selector 303 selects the scramble SEED value 402 which is outputted from the normal scramble filter 104, i.e., the scramble SEED value (0x0100), to output the same.

The selector 105 judges at the next cycle that data to be transferred is not the top of the sector, and selects the next scramble SEED value (0x0100) to output the same as the scramble SEED value 205.

The normal scramble filter 104 receives the scramble SEED value (0x0100) as its input, and outputs the next cycle scramble SEED value (0x0022) for the next cycle.

Here, it is assumed that the selector 303 receives the frame jump signal 404. Then, the selector 303 selects the scramble SEED value (0x4A16) 401 which is obtained from the frame jumping scramble filter 301. The scramble SEED value 401 after the frame-jumping is a scramble SEED value which is by 80-byte of main data after the initial scramble SEED value (0x0001), i.e., a scramble SEED value at the top of the second frame. The scramble SEED value 401 after the frame-jumping is outputted to the selector 105 as the scramble SEED value 206. The selector 105 judges that it is not the top of the sector, and selects the scramble SEED value 401 after the frame-jumping to output the same to the normal scramble filter 104.

When data transfer is started from the second frame due to jumping processing, the frame jumping scramble filter 301 produces, on an assumption that there may be a case where the frame jumping further occur from the second frame, a scramble SEED value for the top of the third frame (0x71B6) by the frame jump filter.

When the frame jumping has occurred again at the second frame, the selector 303 which received the frame jumping signal 404 at its input selects the scramble SEED value for the top of the third frame (0x71B6) from the frame jumping scramble filter 301.

The scramble SEED value at the top of the third frame is outputted to the selector 105. The selector 105 judges that it is not at the sector top, and selects the starting scramble SEED value at the third frame and outputs the same to the normal scramble filter 104.

The frame jumping scramble filter 301 produces a scramble SEED value for the top of the fourth frame thereby to prepare for the frame jumping at the third frame. Since the starting scramble SEED value at the fourth frame is a scramble SEED value which is by 92-byte after the starting scramble SEED value of the third frame, it is 0x5D8E.

Figure 3:
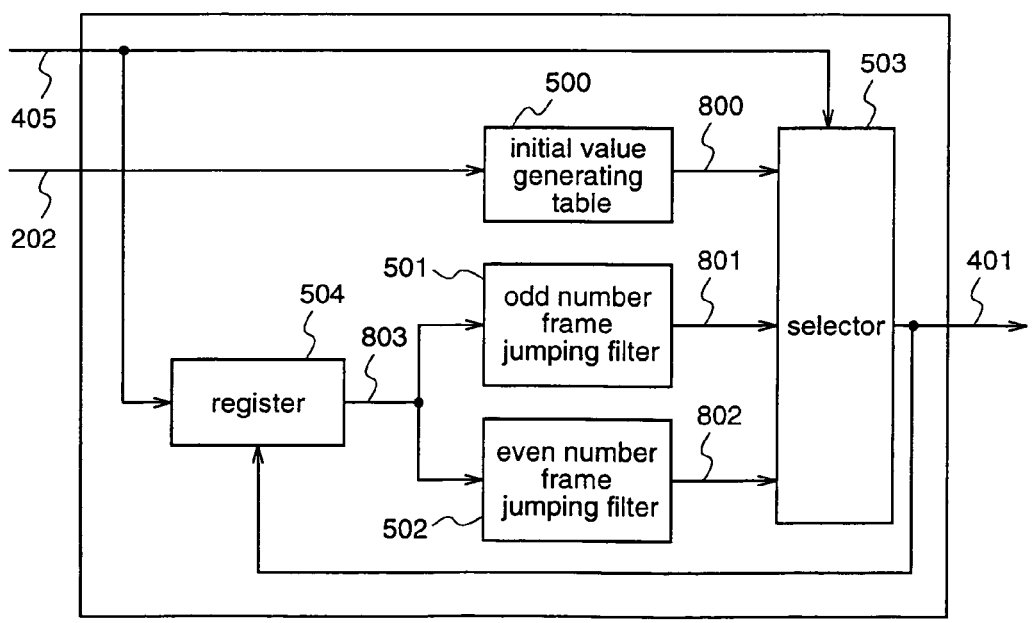
FIG. 3 is a block diagram illustrating a structure of a scramble filter for frame jumping in the data processing device of the second embodiment.

Hereinafter, the details of the frame jumping scramble filter 301 will be described with reference to FIG. 3. In FIG. 3, the frame jumping scramble filter 301 has an initial value generating table 500, an odd number frame jumping filter 501, an even number frame jumping filter 502, a selector 503, and a register 504.

The initial value generating filter 500 receives the ID information 202 at its input, and produces a scramble SEED value at the second frame top, i.e., a scramble SEED value 800 at 80-byte ahead.

The selector 503 receives address information 405 of the data under being transferred, and selects the scramble SEED value 800 during one frame period, to output the same as the scramble SEED value 401 after frame-jumping.

The register 504 receives the scramble SEED value 401 at the second frame top as its input and holds the same.

When the transfer of data proceeds to the second frame, the even number frame jumping filter 502 produce the scramble SEED value 802 at the third frame top using the output signal 803 of the register 504, in this case, the scramble SEED value 401 at the second frame top, to output the same.

The selector 503 selects the scramble SEED value 802 when the data under being transferred is an even number frame, to output the same as the scramble SEED value 401 at the next frame jumping.

Then, the register 504 receives the third frame top scramble SEED value 401 at its input and holds the same.

When the data transfer proceeds to the third frame, the odd number frame jumping filter 501 produces the scramble SEED value 801 for the fourth frame top using the output signal 803 of the register 504, in this case, the scramble SEED value 401 at the third frame top, to output the same.

The selector 503 selects the scramble SEED value 801 when it is an odd number frame other than at the initial transfer (at the first frame), to output the scramble SEED value 401 for the next frame jumping.

Then, the register 504 receives the scramble SEED value 401 for the fourth frame top and holds the same.

The above-described operation is repeatedly performed by one sector (26 frames). Accordingly, when the frame jumping has occurred at the first frame, or even when the frame jumping has occurred at the odd number frame or even number frame, it is possible to obtain correct scramble SEED values from the top of the jumping destination frame.

As described above, the data processing device according to the second embodiment has a frame jumping scramble filter 301 which generates the start scramble SEED value of a jumping destination frame when a frame jumping processing occurs. Therefore, even when a jumping processing occurs during the data being transferred, it is possible to de-scramble scrambled data from a DVD medium using correct ID information, as well as it is possible to scramble data from the host (such as a personal computer or an AV decoder) using correct ID information, in a disc interface.

INDUSTRIAL AVAILABILITY

The present invention is applicable in all data communication fields in which a process of scrambling data and a process of de-scrambling scrambled data are performed, such as optical disc fields including DVDs.

The invention claimed is:

1. A data processing apparatus for scrambling data which are under being transferred or de-scrambling scrambled data which are under being transferred, comprising:
    an ID storing section which stores an ID information relating to a sector which is a scrambling block unit of data under being transferred, which ID information is set by a central processing unit;
    a sector counter section which counts the number of the sectors in the data under being transferred;
    an operation section which adds the ID information from the ID storing section and the sector number information from the sector counter section;
    a scramble seed value table conversion section which converts the addition result which is inputted from the operation section into a scrambling seed value;
    a scramble filter of at least one byte which, making a period during which data of a predetermined length is transferred one cycle, produces a next cycle scramble seed value from the present cycle scramble seed value;
    a selector which selects a scramble seed value which is outputted from the scramble seed table conversion section when the data under being transferred is a top of a sector and selects the scramble seed value which is outputted from the scramble filter section otherwise, to output the selected result to the scramble filter; wherein
    the data under being transferred being scrambled or the scrambled data under being transferred being de-scrambled using the scramble seed value which is outputted from the selector.

2. The data processing apparatus as defined in claim 1 wherein said scramble filter section which includes at least two scrambling filters, selects a scrambling filter in accordance with the data length of the data to be transferred, to produce a next cycle scrambling seed value from the present cycle scrambling seed value.

3. A data processing apparatus for scrambling data which are under being transferred, comprising:
    an ID storing section which stores an ID information relating to a sector which is a scrambling block unit of data under being transferred, which ID information is set by a central processing unit;
    a sector counter section which counts the number of the sectors in the data under being transferred;
    an operation section which adds the ID information from the ID storing section and the sector number information from the sector counter section;
    a scramble seed value table conversion section which converts the addition result which is inputted from the operation section into a scrambling seed value;
    a scramble filter which, making a period during which data of a predetermined length is transferred one cycle, produces a next cycle scramble seed value from the present cycle scramble seed value;
    a jumping processing scramble filter which receives the addition result of the operation section and the address information of the data under being transferred, produces a scramble seed value at the destination using the addition result, providing with a case where a jumping in which a part of the data under being transferred is failed, to hold the same value, and outputs a scramble seed value corresponding to the data address at the destination when the jumping processing has occurred;
    a first selector which selects the scramble seed value which is outputted from the jumping processing scrambling filter when the jumping processing has occurred, and selects the scramble seed value which is outputted from the scrambling filter otherwise, to output the selected result;

a second selector which selects the scramble seed value which is outputted from the scramble seed value table conversion section when the data under being transferred is a top of a sector and selects the scramble seed value which is outputted from the first selector otherwise, to output the selected result to the scramble filter; wherein the data under being transferred being scrambled using the scramble seed value which is outputted from the second selector.

4. A data processing apparatus for de-scrambling scrambled data which are under being transferred, comprising:

an ID storing section which stores an ID information relating to a sector which is a scrambling block unit of data under being transferred, which ID information is set by a central processing unit;

a sector counter section which counts the number of the sectors in the data under being transferred;

an operation section which adds the ID information from the ID storing section and the sector number information from the sector counter section;

a scramble seed value table conversion section which converts the addition result which is inputted from the operation section into a scrambling seed value;

a scramble filter which, making a period during which data of a predetermined length is transferred one cycle, produces a next cycle scramble seed value from the present cycle scramble seed value;

a jumping processing scramble filter which receives the addition result of the operation section and the address information of the data under being transferred, produces a scramble seed value at the destination using the addition result, providing with a case where a jumping in which a part of the data under being transferred is failed, to hold the same value, and outputs a scramble seed value corresponding to the data address at the destination when the jumping processing has occurred;

a first selector which selects the scrambling seed value which is outputted from the jumping processing scrambling filter when the jumping processing has occurred, and selects the scramble seed value which is outputted from the scrambling filter otherwise, to output the selected result; and a second selector which selects the scrambling seed value which is outputted from the scramble seed value table conversion section when the data under being transferred is a top of a sector and selects the scramble seed value which is outputted from the first selector otherwise, to output the selected result to the scramble filter; wherein the scrambled data under being transferred being de-scrambled using the scramble seed value which is outputted from the second selector.

5. The data processing unit as defined in claim 3 wherein said scramble filter unit which includes at least two scramble filters, selects a scrambling filter in accordance with the data length of the data to be transferred, to produce a next scrambling seed value from the present scramble seed value.

6. The data processing device as defined in claim 3 wherein said scramble filter section which includes at least two scramble filters, selects a scrambling filters in accordance with the jumping destination of the data to be transferred, to produce the scramble seed value.

7. The data processing unit as defined in claim 4 wherein said scramble filter unit which includes at least two scramble filters, selects a scrambling filter in accordance with the data length of the data to be transferred, to produce a next scrambling seed value from the present scramble seed value.

8. The data processing device as defined in claim 4 wherein said scramble filter section which includes at least two scramble filters, selects a scrambling filter in accordance with the jumping destination of the data to be transferred, to produce the scramble seed value.

* * * * *